United States Patent
Rao et al.

(10) Patent No.: US 11,023,134 B1
(45) Date of Patent: Jun. 1, 2021

(54) ADDITION OF DATA SERVICES TO AN OPERATING SYSTEM RUNNING A NATIVE MULTI-PATH INPUT-OUTPUT ARCHITECTURE

(71) Applicant: EMC IP Holding Company LLC, Hopkinton, MA (US)

(72) Inventors: Vinay G. Rao, Bangalore (IN); Madhu Tarikere, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/881,086

(22) Filed: May 22, 2020

(51) Int. Cl.
  *G06F 3/06* (2006.01)
  *G06F 9/4401* (2018.01)

(52) U.S. Cl.
  CPC ............ *G06F 3/061* (2013.01); *G06F 3/0614* (2013.01); *G06F 3/0647* (2013.01); *G06F 3/0659* (2013.01); *G06F 3/0685* (2013.01); *G06F 9/4411* (2013.01)

(58) Field of Classification Search
  CPC ................................ G06F 3/061; G06F 9/4411
  USPC ......................................................... 711/154
  See application file for complete search history.

(56) References Cited

U.S. PATENT DOCUMENTS

| | | | |
|---|---|---|---|
| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Jae U Yu
(74) *Attorney, Agent, or Firm* — Ryan, Mason & Lewis, LLP

(57) ABSTRACT

A host device is configured to communicate over a network with a storage system. The host device comprises a multi-path input-output (MPIO) driver configured to control delivery of input-output (IO) operations from the host device to the storage system over selected ones of a plurality of paths through the network, and a data service driver. The data service driver is configured to provide one or more data services on the host device, wherein the one or more data services correspond to respective extensions. The respective extensions are organized in different levels in a stacked configuration. The data service driver is further configured to receive and process a given IO operation through the respective extensions in the stacked configuration. The MPIO driver is a component of first MPIO software for the host device, and the data service driver is a component of second MPIO software for the host device.

20 Claims, 4 Drawing Sheets

(56) References Cited

U.S. PATENT DOCUMENTS

| | | |
|---|---|---|
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 2001/0037438 A1* | 11/2001 | Mathis ............... G06F 21/87 711/163 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0030668 A1* | 2/2004 | Pawlowski ........... G06F 3/0664 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

Microsoft, "About File System Filter Drivers," https://docs.microsoft.com/en-us/windows-hardware/drivers/ifs/about-file-system-filter-drivers, Feb. 10, 2020, 2 pages.

V. Choinski, "Lab Validation Report: EMC PowerPath vs. Windows Native MPIO," Enterprise Strategy Group, Inc. Oct. 2011, 16 pages.

M. Rouse, "Native App," https://searchsoftwarequality.techtarget.com/definition/native-application-native-app, Mar. 2018, 6 pages.

Computer Hope, "Add-On," https://www.computerhope.com/jargon/a/addon.htm, May 4, 2019, 2 pages.

encyclopedia.com, "Native Software," https://www.encyclopedia.com/computing/dictionaries-thesauruses-pictures-and-press-releases/native-software, Apr. 27, 2020, 3 pages.

Microsoft, "Filter Drivers," https://docs.microsoft.com/en-us/windows-hardware/drivers/kernel/filter-drivers, Jun. 16, 2017, 2 pages.

Dell Technologies, "PowerPath Migration Enabler," Data Sheet, Dell Inc., 2020, 2 pages.

EMC Corporation, "EMC PowerPath Migration Enabler," Version 6.x, User Guide P/N 302-001-317, Jul. 2017, 90 pages.

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

* cited by examiner

```
Read_Dispatch(LBA)
{
    ///Check if LBA is there in the cache device
    If (LBA present)
    {
        // read LBA from the device and return
    }
    Else
    {
        // send a read request to the storage array,
        Read_to_storage()
    }
}
Read_completion(LBA)
{
    // read completion for the request getting completed
    // enqueue IO to the thread which is waiting for IO to be
    written to the device
        Enqueue_Io_to_thread(LBA)
}
Write_completion(LBA)
{
    // enqueue IO to the thread waiting for IO to be written to the
    device
        Enqueue_io_to_thread(LBA)
}
```

FIG. 4

ADDITION OF DATA SERVICES TO AN OPERATING SYSTEM RUNNING A NATIVE MULTI-PATH INPUT-OUTPUT ARCHITECTURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Many operating systems are pre-configured with native multi-path IO (native MPIO) software that is an original component of the operating system, and is used for performing the IO operations directed to the particular logical storage volumes or other logical storage devices from the host devices. Various types of storage access protocols can be used by host devices to access the logical storage volumes or other logical storage devices of the storage system, including by way of example Small Computer System Interface (SCSI) access protocols and NVM Express (NVMe) access protocols.

Different ones of the host devices can run different applications with varying workloads and associated IO patterns. Such host devices also generate additional IO operations in performing various data services such as host-based caching of data retrieved from the storage system, IO throttling services, data migration services from one storage system to another storage system and replication services. Given the number of current data services, and new data services that may be introduced in the future, techniques and systems are needed for adding the data services on the host side, and supplementing the capabilities of the native MPIO software.

SUMMARY

Illustrative embodiments provide a solution which utilizes a secondary MPIO architecture to build data services for an operating system already equipped with a native MPIO architecture. The secondary MPIO architecture includes defined interfaces which can be used to plug-in new data services on a host while the native MPIO software remains in use for MPIO operations. Advantageously, the data services are stackable in the secondary MPIO architecture, where each service can be executed independently of the other services in the stack. In addition, the secondary MPIO architecture is configured to non-disruptively upgrade data services without adversely affecting application IO operations.

In one embodiment, an apparatus comprises a host device configured to communicate over a network with a storage system. The host device comprises an MPIO driver configured to control delivery of IO operations from the host device to the storage system over selected ones of a plurality of paths through the network, and a data service driver. The data service driver is configured to provide one or more data services on the host device, wherein the one or more data services correspond to respective extensions. The respective extensions are organized in different levels in a stacked configuration. The data service driver is further configured to receive and process a given IO operation through the respective extensions in the stacked configuration. The MPIO driver is a component of first MPIO software for the host device, and the data service driver is a component of second MPIO software for the host device.

These and other illustrative embodiments include, without limitation, apparatus, systems, methods and computer program products comprising processor-readable storage media.

BRIEF DESCRIPTION OF THE DRAWINGS

FIG. 4 illustrates example pseudocode for scheduling a thread in a caching service level to read data from a storage array and store a copy of the data in a host-based cache, according to an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
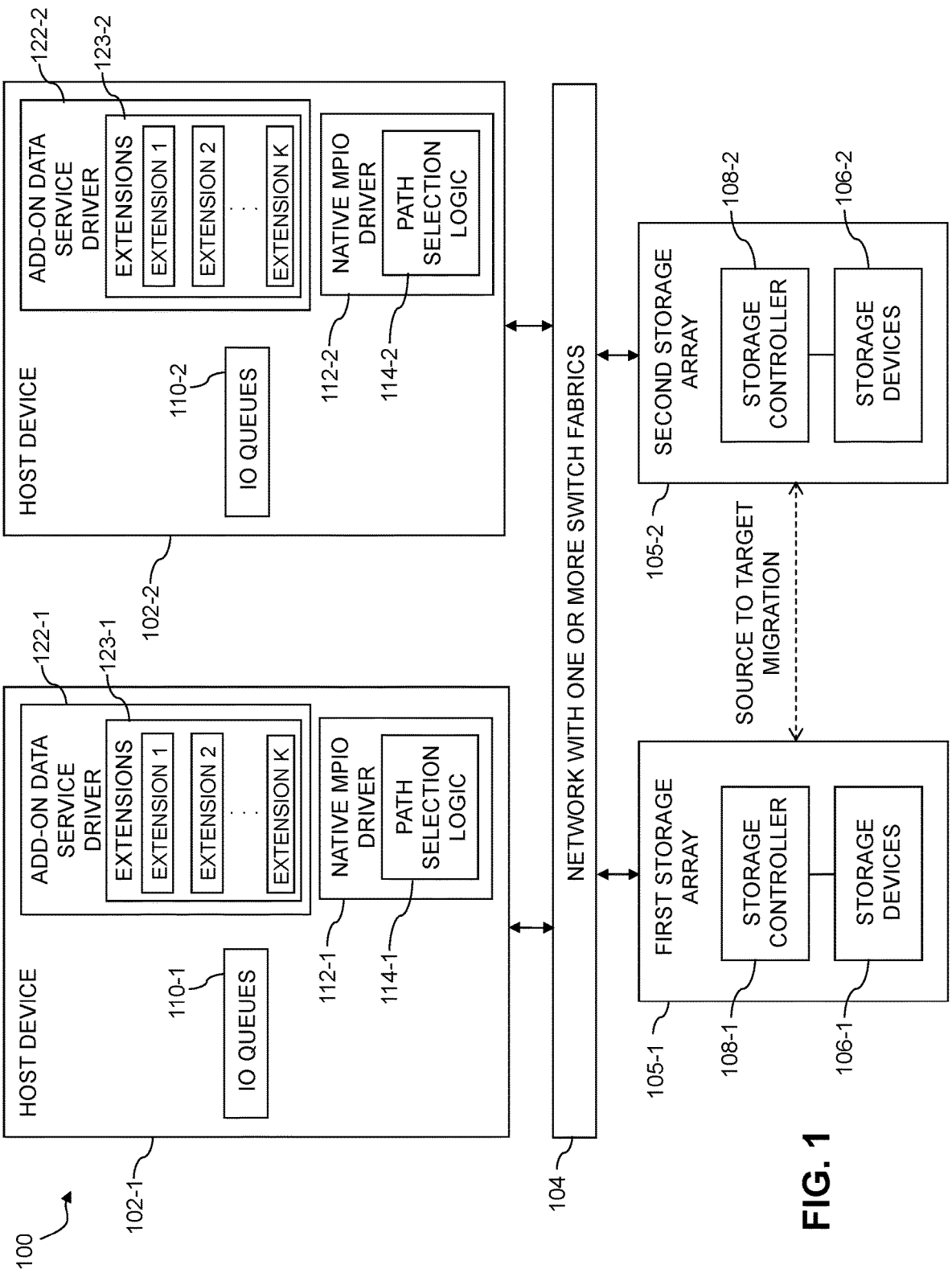
FIG. 1 is a block diagram of an information processing system configured with functionality for utilizing a secondary MPIO architecture to build data services for an operating system equipped with a native MPIO architecture in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, respective native MPIO drivers 112-1 and 112-2, and respective add-on data service drivers 122-1 and 122-2. The MPIO drivers 112 and add-on data service drivers 122 collectively comprise a multi-path layer of the host devices 102. The multi-path layer provides automated path selection functionality using respective instances of path selection logic 114-1 and 114-2 implemented within the MPIO drivers 112. The multi-path layer further provides functionality for adding data services to the host devices 102 by using the add-on data service drivers 122 to organize extensions 123-1 and 123-2 in a stacked configuration. For example, extension 1, extension 2, . . . extension K corresponding to respective data services are organized in different levels in a stacked configuration.

According to an embodiment, the data services are add-on services to the native MPIO drivers 112-1 and 112-2 such that, as shown in FIG. 1, the add-on data service drivers 122-1 and 122-2 are stacked over the native MPIO drivers 112-1 and 112-2. In this embodiment, data (e.g., IO operations) flows from the add-on data service drivers 122-1 and 122-2 to the native MPIO drivers 112-1 and 112-2.

As used herein, "native" refers to original and/or pre-configured components of an operating system, device or platform. The components include for example, drivers, applications and/or software. Native drivers, applications and/or software are developed, designed, written and/or built to run on a particular system, platform or device.

As used herein, a native MPIO driver 112 refers to a driver for native MPIO software. The native MPIO software is multi-pathing software that is pre-configured on and developed for an operating system of a host device 102, such that the native MPIO software is an original component of the operating system of the host device 102. The native MPIO drivers 112 control MPIO operations directed to the particular logical storage volumes or other logical storage devices of the storage arrays 105 from the host devices 102. The native MPIO drivers 112 may comprise, for example, MPIO drivers for native MPIO software of operating systems such as, but not necessarily limited to, Windows, ESX or Linux operating systems.

As used herein, "add-on" refers to a component that is added to a program or to another system component to provide that system component with additional or enhanced features and capabilities. In some instances, add-on components (e.g., drivers, applications and/or software) are created by developers not affiliated with the enterprises associated with the native software and/or operating system.

The add-on data service drivers 122 comprise, for example, drivers corresponding to external MPIO software that is not an original component of (e.g., not native to) the operating system of the host device 102. In other words, an add-on data service driver 122 corresponds to MPIO software that is an added component to the operating system of the host device 102. According to an embodiment, the add-on data service driver 122 is a component of PowerPath® multi-pathing software from Dell EMC. This and other references to PowerPath® herein are presented by way of illustrative example only, and should not be construed as limiting in any way. The add-on data service driver 122 is configured to add one or more data services to a host device 102. In one or more embodiments, the add-on data service driver 122 has a "c-clamp" architecture which has top and bottom portions that surround a stacked configuration of data service extensions 123. According to one or more embodiments, the data service driver 122 organizes the respective extensions (extension 1, 2, . . . k) in different levels in a stacked configuration, and receives and processes input-output operations through the respective extensions in the stacked configuration. The data service drivers 122 can be designed to be inserted into or interface with the native MPIO drivers 112 to add data services to the host devices 102 without affecting or inhibiting the normal functionality of the MPIO drivers 112.

The extensions 123 are enclosed within the data service drivers 122. Each extension can provide a specific data service at its level. The data service drivers 122 provide the flexibility to add multiple data services one over the other in the stacked configuration. The data services that can be added include, but are not necessarily limited to, a host-based caching service, an IO throttling service and a non-disruptive data migration service for migration from one storage system to another storage system. The data service drivers 122 enable data services to be upgraded and/or added to a host device 102 non-disruptively without disruption of IO operations originating from applications on a host device 102.

The native MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the native MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths. A given path discovery scan can be performed utilizing known functionality of MPIO drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The native MPIO driver 112-1 in some embodiments comprises a user-space portion and a kernel-space portion. The kernel-space portion of the native MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the native MPIO driver 112-1 are possible.

For each of the one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, the native MPIO driver 112-1 of host device 102-1 is configured to control delivery of IO operations from the host device 102-1 to the first and second storage arrays 105 over selected paths through the network 104.

The embodiments provide a mechanism by which a secondary MPIO architecture, which is not native to an operating system of a host device 102-1, is used to add and implement data services for the host device 102-1 that uses a native MPIO architecture for multi-pathing functionality. The secondary MPIO architecture comprises, for example, PowerPath® multi-pathing software, of which the add-on data service driver 122-1 is a component. Other host device components, such as caching and migration control logic implemented in one or more host device processors, can additionally or alternatively implement aspects of the functionality associated with the addition and execution of data services for the host device 102-1. The disclosed embodiments are therefore not limited to embodiments in which functionality associated with the addition and execution of data services is controlled at least in part by an add-on data services driver or multi-path layer.

According to one or more embodiments, the extensions 123 are general purpose extensions which provide a standard set of interfaces through which various third-party drivers can be plugged in to the operating system of the host devices 102. The extensions 123 may comprise, but are not necessarily limited to, PowerPath® GPX extensions. In a non-limiting operational example, host-based caching and migration services can be added to the operating system of a host device 102-1 with respective extensions (e.g., extension 1 and extension 2) in a stacked configuration as managers.

In the operational example, in connection with adding and implementing two data services, such as caching and migration services, for a host device 102-1, a stacked configuration of the data services in different levels is created in the data service driver 122-1. The data services are managed by respective extensions in the stacked configuration. A user such as, for example, an administrator may determine at what level each data service is to be installed in the stack. Alternatively, the data service driver 122-1 automatically determines the level at which each data service is to be installed in the stack based on one or more specified criteria.

In accordance with one or more embodiments, multi-pathing functionality is decoupled from the secondary MPIO architecture. In order to achieve the decoupling, the secondary MPIO architecture does not claim logical storage devices used by the native MPIO architecture for the multi-pathing service of the secondary MPIO architecture. Alternatively, the multi-pathing functionality is removed from the secondary MPIO architecture prior to installation on the operating system of the host device 102-1. In some instances, the native MPIO driver 112-1 is configured to use one or more features of the decoupled multi-pathing functionality from the secondary MPIO software to control the delivery of IO operations from the host device 102-1 to the storage arrays 105.

In order for the secondary MPIO architecture to send IO operations to the added data services managed by the extensions 123-1, the data service driver 122-1 is configured to claim one or more logical storage devices used by the native MPIO software, and direct IO operations corresponding to the claimed logical storage devices of the storage arrays 105 to the respective extensions 123-1 in the stacked configuration. In claiming the logical storage devices, the data services driver 122-1 is configured to create one or more internal objects corresponding to the secondary MPIO software on one or more of the logical storage devices used by the native MPIO software. In addition, the data service driver 122-1 traps one or more device entry points for the logical storage devices that are being claimed. The trapping enables the IO operations in connection with the added data services to flow through the respective extensions 123-1 in the stacked configuration. In order to trap the device entry points, the data service driver sends an IO command (IOCMD) to a kernel of the secondary MPIO software. Entry points are trapped without disrupting normal IO operations to the logical storage devices that are controlled by the native MPIO driver 112-1. Once the entry points are trapped, IO operations are able to flow through the stack of the respective extensions 123-1.

In an illustrative embodiment, the native MPIO driver 112-1 creates a logical storage device by aggregating the native operating system devices. When adding new data services for these devices, logical storage device entry points for these devices are trapped. After trapping these entry points, the stack of the extensions 123-1 corresponding to the data services can be created, so that every IO operation to a native MPIO pseudo device would be sent to each of the data services in the stack. A "pseudo device" or other type of composite device having a single device identity, groups all paths to a volume on a storage device.

In one or more embodiments, the caching service checks if data is present in a host-based cache which it is managing through one of the extensions in the data service driver 122-1, and returns the data from the cache if the data is available. If a user wants to use host-based caching for read performance with new persistent storage class memory, the data service driver 122-1 is configured to add a data service for read caching on the host device 102-1. This data service would reside within the data service driver 122-1, and is managed by one of the extensions in the stack.

For a write IO operation in connection with the caching service, the data service driver 122-1 dispatches the IO operation down the stack through each of the extensions 123-1. Once a write completes and the IO operation reaches a level in the stack corresponding to the host-based caching service, the data service driver 122-1 schedules a thread in the caching service level to read a written data block from a storage array 105-1 and store a copy of the data block in the host-based cache.

According to an illustrative embodiment, the extensions 123-1 are stacked depending on the level at which the service is to operate. IO operations travel through the stack, where each of the respective services can be enabled or disabled. If a service is disabled and an IO operation reaches that specific layer in the stack, that layer passes on the IO operation to the layer below during dispatch and to the above layer during completion. Referring to the pseudocode 400 in FIG. 4, if data is not in a cache, a thread in a caching service level can be scheduled to read data from a storage array and then store a copy of the data in a host-based cache. According to the pseudocode 400, there is check to determine whether a logical block address (LBA) is present in the cache. The LBA refers to an LBA number on a volume that a read request is attempting to read.

In one or more embodiments, there are two types of migration in a migration service administered by the data service driver 122-1. The two types are based on using a host-based data copy or using an array offload engine provided by a target storage array. As can be seen in FIG. 1, storage array 105-1 or 105-2 can be source or target arrays in the case of a migration. A user can initiate a migration using any one of the two types. In accordance with one or more embodiments, the migration service provides a mechanism to clone data that is being sent from a host-based application during the migration (e.g., "hot" data).

Once a migration is complete, a data service driver 122-1, through the migration extension, is configured to issue a commit command to move from a source storage array to a target storage array, and to redirect IO operations to the target array. In addition, the data service driver 122-1 is further configured to use one or more application programming interfaces (APIs) provided by the native MPIO software to change a persistence mapping database or file(s). The persistence mapping database is changed so that a native MPIO pseudo device points new native MPIO paths to the target array. The change can be required during a reboot of a host device 102-1, so that applications do not need to be reconfigured.

The migration service can perform a host-based migration or use an array data mover service. For host-based migration, the active (hot) IO operations to a source device are cloned to a target device. Once the migration is committed, the persistence mapping database for the native MPIO pseudo device is modified so that on the next host reboot the native MPIO pseudo device which an application is using points the MPIO paths to the target array.

One or more upper layers of a host device illustratively include one or more host device processor layers, upper operating system layers and/or application layers of the host device, which are implemented at least in part above the multi-path layer in a layered architecture of the host device 102-1. The term "multi-path layer" as used herein is intended to be broadly construed, and may be implemented, for example, as an MPIO layer comprising one or more MPIO drivers such as native MPIO driver 112-1 and one or more data service drivers such as data service driver 122-1. Other types of multi-path layers can be implemented using other types of multi-pathing components of a host device.

The term "storage pool" as used herein is intended to encompass any of a variety of arrangements in which different logical storage devices utilize the same underlying set of physical storage devices of a storage array or other type of storage system, and therefore the logical storage devices can be reconfigured without requiring any copying of data of the underlying set of physical storage devices.

In embodiments in which a first logical storage device and a second logical storage device are not part of the same storage pool on the same storage array, a migration session can be illustratively activated to copy data of the first logical storage device to the second logical storage device, such that upon successful completion of the migration session, the first and second storage devices contain the same data and have reached a synchronized state. Such copying illustratively occurs prior to initiation of the switchover from the first logical storage device to the second logical storage device, but in other embodiments can occur at other times, such as during an initial stage of the switchover. The first and second logical storage devices are also referred to as respective source and target devices in the context of a migration process that involves copying of data from the source device to the target device.

According to one or more embodiments, a migration process is administered by a data services driver through a migration extension. A migration extension comprises, but is not necessarily limited to, a PowerPath® Migration Enabler (PPME).

Once activated, the migration session can be utilized to carry out actual copying of data from the source logical storage device to the target logical storage device. The copying of data is also referred to herein as being performed as part of a migration process. Such a migration process can encompass, for example, the activated migration session in the host device 102-1, and possibly also a corresponding migration session activated in the first and second storage arrays 105, with the storage-side process illustratively configured for storage array based copying of data from the source logical storage device to the target logical storage device in a manner that avoids excessive consumption of host device resources.

The host device 102-1 is further configured to terminate the activated migration session responsive to completion of the copying of the data of the source logical storage device to the target logical storage device. The source logical storage device can be deprecated or repurposed responsive to termination of the activated migration session.

As indicated above, activation of the migration session in the host device 102-1 causes a migration process to be performed in which data is copied from the source logical storage device to the target logical storage device.

As another example, the migration process can include a host-based migration process in which the first storage array 105-1 controls the copying of the data from the first storage array 105-1 to the second storage array 105-2, but with significant involvement of the host device 102-1 in the migration process. For example, the data service driver 122-1 of the host device 102-1 can initiate the data copying.

Other types of migration processes involving at least one of the host device 102-1 and the storage arrays 105 can be used in other embodiments.

As described herein above, the host device 102-1 is further configured to obtain, in conjunction with the migration process, an indication from the second storage array 105-2 that the first and second storage arrays 105 have achieved synchronization with respect to the migration of the source logical storage device to the target logical storage device, and to commit to utilization of the target logical storage device responsive to the indication. Once committed to utilizing the target logical storage device, the host device 102-1 no longer utilizes the source logical storage device.

Multiple host devices 102 can be similarly notified that they should commit to the utilization of the target logical storage device, once the first and second storage arrays 105 have achieved synchronization with respect to the migration of the source logical storage device to the target logical storage device.

For example, each of the host devices 102 is illustratively configured to obtain a notification from at least one of the first and second storage arrays 105 directing that the host device move from utilization of the source logical storage device to utilization of the target logical storage device.

After all of the host devices 102 using the source logical storage device have committed in the manner described above to utilization of the target logical storage device, the migration from source to target is considered fully complete, and the source logical storage device can therefore be removed or otherwise deleted from the system 100.

Accordingly, in some embodiments, at least one of the first and second storage arrays 105 will notify all of the host devices 102 that are working with the source logical storage device to instead start working with the target logical storage device. This is illustratively achieved by a given one of the storage arrays 105 issuing a check condition notification or other type of notification at a particular point in time to each of the host devices 102, even if that host device is turned off or in a "sleep" state. Any such host device will address the notification when it is later turned on or "wakes up," such that it will automatically start working with the target logical storage device instead of the source logical storage device.

Such features are examples of what is more generally referred to herein as "automated seamless migration" of logical storage devices. Illustrative embodiments are "automated" in that they can be performed without manual intervention of a host administrator or storage administrator, and are also "seamless" in that each host device seamlessly transitions from usage of the source logical storage device to usage of the target logical storage device at an appropriate time, without the need for any synchronization between multiple host devices. Other automated seamless migration arrangements can be used in other embodiments.

In order to achieve non-disruptive migration, logical storage devices of the native MPIO architecture can be claimed by the data service driver 122-1 as described herein above, so that IO operations to the claimed devices can be directed to the stacked configuration. The redirected IO operations through the stack are processed by the migration service extension to perform the migration. Migration can be performed between storage arrays from different service providers (e.g., from any non-Dell EMC array to a Dell EMC array), or between storage arrays of the same service provider (e.g., within the Dell EMC storage family (XtremIO™ to PowerMax™), (XtremIO™ to Trident™), (within FLEX nodes), etc.).

The above-described functions associated with the addition of data services to the host device 102-1 and the execution of such data services are illustratively carried out at least in part utilizing the data service driver 122-1 and its extensions 123-1. For example, in some embodiments, the functionality associated with the addition and execution of added data services can be implemented substantially entirely under the control of the data service driver 122-1, and in such embodiments the data service driver 122-1 is illustratively configured to control performance of certain steps of the flow diagram to be described below in conjunction with FIG. 2. Additional or alternative host device components, such as caching and migration control logic implemented in the host device, can be used to control performance of a data services building process such as that of FIG. 2.

It is assumed that the other MPIO driver 112-2 and the other data service driver 122-2 are configured in a manner similar to that described above and elsewhere herein for the first MPIO driver 112-1 and the first data service driver 122-1. For example, the MPIO driver 112-2 is therefore similarly configured to select IO operations from its corresponding one of the sets of IO queues 110 for delivery to the storage arrays 105 over the network 104, and the data service driver 122-2 is similarly configured to control IO operations through its extensions 123-2 to perform at least portions of the disclosed functions associated with the addition of data services to a host device and the execution of such data services. Accordingly, aspects of the functionality associated with the addition and execution of added data services described above in the context of the first data service driver 122-1 and the first host device 102-1 are assumed to be similarly performed by the other data service driver 122-2 and the other host device 102-2.

The MPIO functionality associated with the secondary MPIO architecture comprising the data service driver 122-1 may comprise MPIO functionality such as that described in "Dell EMC SC Series Storage and Microsoft Multipath I/O," Dell EMC, CML1004, July 2018, which is incorporated by reference herein. Such MPIO functionality is suitably modified in illustrative embodiments disclosed herein to support the addition and execution of added data services.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112, instances of path selection logic 114, add-on data service drivers 122 and extensions 123 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of caching and migration control logic implemented in the host devices 102 and the storage arrays 105 can be used to perform at least portions of the functionality associated with the addition and execution of added data services.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising one or more host devices and at least one storage system. For example, the process can be implemented using first and second storage systems comprising respective first and second storage arrays, possibly but not necessarily arranged in an active-active configuration, with each storage array comprising a plurality of storage devices. The storage devices of the first and second storage arrays are assumed to include logical storage volumes or other types of logical storage devices. Alternatively, the process can be implemented using a single storage array or other storage system also comprising logical storage devices. The logical storage devices of one or more storage systems are referred to in the following description as simply "devices."

Figure 2:
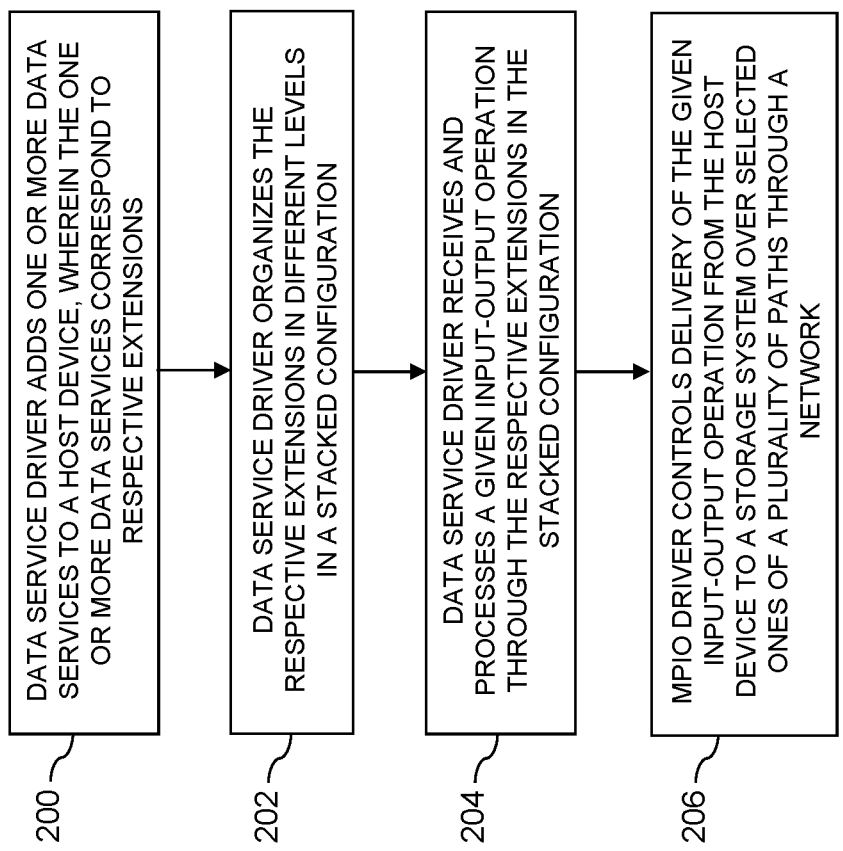
FIG. 2 is a flow diagram of a process for utilizing a secondary MPIO architecture to build data services for an operating system equipped with a native MPIO architecture in an illustrative embodiment.

Certain steps of the FIG. 2 process are illustratively performed primarily by or under the control of an MPIO layer of a given host device comprising a data service driver, such as the data service driver 122-1 of the first host device 102-1 of system 100, although other arrangements of system components can perform at least portions of one or more of the steps in other embodiments.

In step 200, a data service driver (e.g., data service driver 122-1) adds one or more data services to a host device. The one or more data services correspond to respective extensions. While this embodiment refers to the data service driver adding one or more data services to the host device, it is to be understood that the embodiments are not necessarily limited thereto, and other techniques can be used to provide the one or more data services on the host device. For example, the one or more data services may already be loaded onto the host device, and the data service driver provides the data services by implementing and/or executing the already loaded data services.

In step 202, the data service driver organizes the respective extensions in different levels in a stacked configuration, and in step 204, the data service driver receives and processes a given IO operation through the respective extensions in the stacked configuration. The data services can include, for example, host-based caching and migration services. According to an embodiment, an IO operation passes through each of the extensions in the stacked configuration (e.g., extensions 123-1) where extensions can be enabled or disabled and, upon reaching certain levels, tasks can be scheduled. In this embodiment, the IO operation traverses through all of the extensions. In another embodiment, a particular IO operation passes through the extensions in the stacked configuration until the particular IO operation reaches an extension level matching the services associated with the particular IO operation, and does not pass through the remaining levels after reaching the level with the matching service. In some embodiments, the extensions correspond to mutually exclusive services that can be performed independent of each other, and in other embodiments, the extensions may correspond to related services whose performance is dependent on the performance of other services in the stack.

In step 206, an MPIO driver (e.g., native MPIO driver 112-1) controls delivery of the given IO operation from the host device to a storage system over selected ones of a plurality of paths through a network. The MPIO driver is a component of first MPIO software for the host device. The first MPIO software is an original component of an operating system of the host device (e.g., native MPIO software). The data service driver is a component of second MPIO software for the host device. The second MPIO software is an added component to the operating system of the host device. As used herein, "first MPIO software" and "second MPIO software" are to be broadly construed, and may encompass different software or different portions of the same set of software.

The given IO operation may comprise a write IO operation, wherein, in receiving and processing the given input-output operation, the data service driver dispatches the write IO operation down a stacked configuration comprising the extensions. Upon reaching a level corresponding to a host-based caching service, the data service driver, through a caching service extension, schedules a thread in the level corresponding to the host-based caching service to read a written data block from a storage array and store a copy of the written data block in a host-based cache.

In the case of a migration service, the data service driver, through a migration extension, issues a commit command to move to a target device (e.g., target storage array) once a migration is complete, and to redirect the IO operations from a source device (e.g., source storage array) to the target device. The data service driver can use an API provided by the first MPIO software to change a persistence mapping database.

In one or more embodiments, the data service driver creates one or more internal objects corresponding to the second MPIO software on one or more logical storage devices used by the first MPIO software. The data service driver also traps one or more device entry points for one or more logical storage devices used by the first MPIO software. The trapping enables the given IO operation to flow through the respective extensions in the stacked configuration. In trapping the one or more device entry points, the data service driver sends an IOCMD to a kernel of the second MPIO software.

In accordance with one or more embodiments, the host device is configured to decouple multi-pathing functionality from the second MPIO software. The MPIO driver can use the decoupled multi-pathing functionality from the second MPIO software in controlling the delivery of the IO operations from the host device to the storage system.

The data service driver can claim one or more logical storage devices used by the first MPIO software, and direct one or more of the IO operations corresponding to the claimed logical storage devices to the respective extensions in the stacked configuration.

The steps of the FIG. 2 process are shown in sequential order for clarity and simplicity of illustration only, and certain steps can at least partially overlap with other steps. Also, one or more of the steps referred to as being performed by a particular system component, such as an MPIO layer, can in other embodiments be performed at least in part by one or more other system components.

As indicated above, different instances of the FIG. 2 process can execute at least in part in parallel with one another for different devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality associated with the addition of data services and execution of the added data services. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for the addition and implementation of data services within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
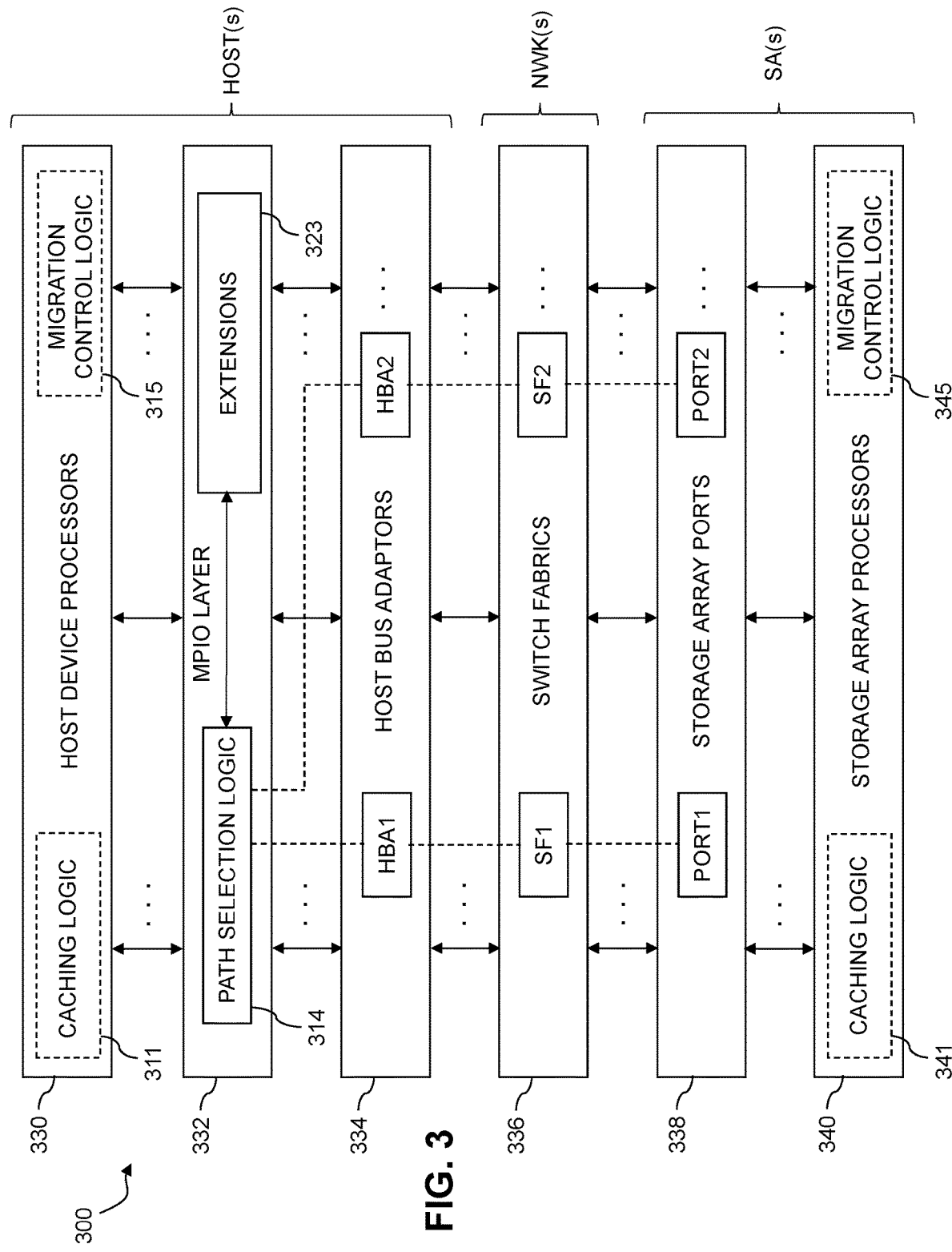
FIG. 3 is a block diagram showing multiple layers of a layered system architecture that includes a multi-path layer with functionality for building data services for an operating system equipped with a native MPIO architecture in an illustrative embodiment.

Referring now to FIG. 3, another illustrative embodiment is shown. In this embodiment, an information processing system 300 comprises host-side caching logic 311, host-side migration control logic 315, path selection logic 314, extensions 323, storage-side caching logic 341 and storage-side migration control logic 345. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks ("NWKs"), and the storage array port layer 338 and storage array processor layer 340 are associated with one or more storage arrays ("SAs").

The system 300 in this embodiment implements the addition of data services to a host device and the execution of such data services. The functionality associated with the addition and execution of added data services in this embodiment is assumed to be controlled at least in part by host-side caching logic 311, host-side migration control logic 315, path selection logic 314 and extensions of the MPIO layer 332, storage-side caching logic 341 and storage-side migration control logic 345, although other arrangements are possible.

The host-side caching logic 311 and host-side migration control logic 315 implemented in the host processor layer 330, as well as the extensions 323 in the MPIO layer 323 control host-based caching and migration processes of the system 300. The caching and migration control logic 311 and 315 can include multiple distinct caching and migration control logic instances for respective ones of a plurality of host devices of the system 300. Multiple instances of extensions 323 are also included for respective ones of a plurality of host devices of the system 300.

The storage-side caching logic 341 and the storage-side migration control logic 345 implemented in the storage array processor layer 340 control elements of caching and migration processes in storage arrays of the system 300. The caching and migration control logic 341 and 345 can include multiple distinct caching and migration control logic instances for respective ones of a plurality of storage arrays of the system 300.

The host-side and storage-side caching and migration control logic 311, 315, 341 and 345 are illustratively configured to implement at least portions of the functionality associated with the addition of data services and execution of the added data services as disclosed herein. These components are shown in dashed outline in the figure, as they can be implemented in different locations within the system 300, or in a distributed manner across multiple locations. For example, the host-side caching and migration control logic 311 and 315, although illustratively shown as part of the host processor layer 330, can be implemented at least in part in the MPIO layer 332. As another example, the storage-side caching and migration control logic 341 and 345, although illustratively shown as part of the storage array processor layer 340, can be implemented at least in part in the storage array port layer 338.

The MPIO layer 332 is an example of what is also referred to herein as a multi-path layer, and comprises one or more native MPIO drivers implemented in respective host devices. Each such MPIO driver illustratively comprises an instance of path selection logic 314 configured to perform path selection for delivery of TO operations to the storage arrays of system 300 as previously described. The path selection logic 314 in some embodiments operates in conjunction with the host-side and storage-side caching and migration control logic 311, 315, 341 and 345 in implementing at least portions of the functionality associated with the addition of data services and execution of the added data services as disclosed herein. Additional or alternative layers and path selection logic arrangements can be used in other embodiments.

The MPIO layer 332 comprises one or more data service drivers implemented in respective host devices. Each such data service driver illustratively comprises an instance of extensions 323 configured to add and implement data services for a host device as previously described. The extensions 323 in some embodiments operate in conjunction with the host-side and storage-side caching and migration control logic 311, 315, 341 and 345 in implementing at least portions of the functionality associated with the addition of data services and execution of the added data services as disclosed herein. Additional or alternative layers and extension arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of caching migration control logic 311, 315, 341 or 345 and extensions 323 provide functionality for the addition of data services and execution of the added data services, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular arrangements in connection with providing functionality for adding data services and executing the added data services described above are presented by way of illustrative example only. Numerous alternative arrangements can be used in other embodiments.

The illustrative embodiments disclosed herein can provide a number of significant advantages relative to conventional arrangements. For example, the embodiments provide a mechanism through which data services can be added to a host device running native MPIO software, thereby expanding the capabilities of the operating system. Currently, native MPIO architectures are limited in the number and types of data services they are able to provide in connection with IO operations. For example, many native MPIO architectures lack migration and host-based caching services, and/or provide data services with limited features. Advantageously, the embodiments provide techniques to use a secondary MPIO architecture to add and/or upgrade data services for an existing MPIO architecture without disrupting IO operations being controlled by the existing architecture.

Currently, there are no such techniques for adding and implementing new data services for a native MPIO architecture. The embodiments permit the addition and/or upgrading of data services on a host device and, through the use of stackable extensions, are scalable to add multiple data services to a native MPIO architecture without disrupting its current configuration. Since the extensions run independently of each other and are stackable over each other, as new data services become available, additional extensions can be added to the stack without disrupting the other data services. Similarly, older or outdated data services can also be removed without disrupting the remaining data services by removing their corresponding extensions from the stack.

In another advantage, the secondary MPIO architecture used to add and/or upgrade data services for an existing MPIO architecture comprises well-defined interfaces which can be used to plug-in any new services on a host device. With the embodiments, users can maintain a native MPIO infrastructure while adding and/or upgrading data services without disrupting current IO operations of applications being executed on a host device.

The disclosed functionality associated with the addition and execution of added data services can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU)

or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 and the extensions 123 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, data service drivers, extensions, caching logic, migration control logic and additional or alternative components. Also, the particular configurations of system and device elements and associated processing operations illustratively shown in the drawings can be varied in other embodiments. For example, a wide variety of different host device, MPIO driver, data service driver and storage system configurations and associated arrangements for the addition of data services and execution of the added data services can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
 a host device comprising a processor coupled to a memory;
 the host device being configured to communicate over a network with a storage system;
 the host device comprising:
 a multi-path input-output driver configured to control delivery of input-output operations from the host device to the storage system over selected ones of a plurality of paths through the network, wherein the multi-path input-output driver is a component of first multi-path input-output software for the host device; and
 a data service driver, wherein the data service driver is a component of second multi-path input-output software for the host device, and wherein the data service driver is configured:
 to provide one or more data services on the host device, wherein the one or more data services correspond to respective extensions, the respective extensions being organized in different levels in a stacked configuration; and
 to receive and process a given input-output operation through the respective extensions in the stacked configuration.

2. The apparatus of claim 1 wherein the first multi-path input-output software is an original component of an operating system of the host device, and wherein the second multi-path input-output software is an added component to the operating system of the host device.

3. The apparatus of claim 1 wherein the one or more data services comprise a host-based caching service.

4. The apparatus of claim 3 wherein the given input-output operation comprises a write input-output operation, and wherein, in receiving and processing the given input-output operation, the data service driver is configured:
 to dispatch the write input-output operation down the stacked configuration; and
 upon reaching a level corresponding to the host-based caching service, to schedule a thread in the level corresponding to the host-based caching service to read a written data block from a storage array and store a copy of the written data block in a cache.

5. The apparatus of claim 1 wherein the one or more data services comprise a migration service.

6. The apparatus of claim 5 wherein the data service driver is further configured:
 to issue a commit command to move to a target device once a migration is complete; and
 to redirect the input-output operations to the target device.

7. The apparatus of claim 6 wherein the data service driver is further configured to use an application programming interface provided by the first multi-path input-output software to change a persistence mapping database.

8. The apparatus of claim 1 wherein the data service driver is further configured to create one or more objects corresponding to the second multi-path input-output software on one or more logical storage devices used by the first multi-path input-output software.

9. The apparatus of claim 1 wherein the data service driver is further configured to trap one or more device entry points for one or more logical storage devices used by the first multi-path input-output software, wherein the trapping enables the given input-output operation to flow through the respective extensions in the stacked configuration.

10. The apparatus of claim 9 wherein, in trapping the one or more device entry points, the data service driver is configured to send an input-output command to a kernel of the second multi-path input-output software.

11. The apparatus of claim 1 wherein the host device is configured to decouple multi-pathing functionality from the second multi-path input-output software.

12. The apparatus of claim 11 wherein the multi-path input-output driver is configured to use the decoupled multi-pathing functionality from the second multi-path input-output software in controlling the delivery of the input-output operations from the host device to the storage system.

13. The apparatus of claim 1 wherein the data service driver is further configured:
  to claim one or more logical storage devices used by the first multi-path input-output software; and
  to direct one or more of the input-output operations corresponding to the claimed one or more logical storage devices to the respective extensions in the stacked configuration.

14. A method performed by a host device configured to communicate over a network with a storage system, comprising:
  configuring a multi-path input-output driver of the host device to control delivery of input-output operations from the host device over selected ones of a plurality of paths through the network, wherein the multi-path input-output driver is a component of first multi-path input-output software for the host device;
  configuring a data service driver to provide one or more data services on the host device, wherein the one or more data services correspond to respective extensions, the respective extensions being organized in different levels in a stacked configuration, and wherein the data service driver is a component of second multi-path input-output software for the host device;
  the data service driver:
  receiving and processing a given input-output operation through the respective extensions in the stacked configuration;
  wherein the host device comprises a processor coupled to a memory.

15. The method of claim 14 wherein the data service driver is further configured to create one or more objects corresponding to the second multi-path input-output software on one or more logical storage devices used by the first multi-path input-output software.

16. The method of claim 14 wherein the data service driver is further configured to trap one or more device entry points for one or more logical storage devices used by the first multi-path input-output software, wherein the trapping enables the given input-output operation to flow through the respective extensions in the stacked configuration.

17. The method of claim 14 wherein the data service driver is further configured:
  to claim one or more logical storage devices used by the first multi-path input-output software; and
  to direct one or more of the input-output operations corresponding to the claimed one or more logical storage devices to the respective extensions in the stacked configuration.

18. A computer program product comprising a non-transitory processor-readable storage medium having stored therein program code of one or more software programs, wherein the program code, when executed by a host device comprising a multi-path input-output driver and a data service driver, the host device being configured to communicate over a network with a storage system:
  causes the multi-path input-output driver to control delivery of input-output operations from the host device to the storage system over selected ones of a plurality of paths through the network, wherein the multi-path input-output driver is a component of first multi-path input-output software for the host device; and
  causes the data service driver:
  to provide one or more data services on the host device, wherein the one or more data services correspond to respective extensions, the respective extensions being organized in different levels in a stacked configuration; and
  to receive and process a given input-output operation through the respective extensions in the stacked configuration;
  wherein the data service driver is a component of second multi-path input-output software for the host device.

19. The computer program product of claim 18 wherein the program code further causes the data service driver to create one or more objects corresponding to the second multi-path input-output software on one or more logical storage devices used by the first multi-path input-output software.

20. The computer program product of claim 18 wherein the program code further causes the data service driver:
  to claim one or more logical storage devices used by the first multi-path input-output software; and
  to direct one or more of the input-output operations corresponding to the claimed one or more logical storage devices to the respective extensions in the stacked configuration.

\* \* \* \* \*